United States Patent
Oh et al.

(10) Patent No.: US 8,887,064 B1
(45) Date of Patent: Nov. 11, 2014

(54) MANAGING CALENDAR INFORMATION AMONG USERS

(75) Inventors: Daesik Oh, Overland Park, KS (US); Michael DaLaet, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 930 days.

(21) Appl. No.: 12/485,477

(22) Filed: Jun. 16, 2009

(51) Int. Cl.
*G06F 3/048* (2013.01)
*G06Q 10/10* (2012.01)

(52) U.S. Cl.
CPC .......... *G06Q 10/109* (2013.01); *Y10S 715/963* (2013.01)
USPC ............................ 715/751; 715/759; 715/963

(58) Field of Classification Search
CPC .................................................. G06Q 10/109
USPC .......................................... 715/751, 759, 963
See application file for complete search history.

(56) References Cited

U.S. PATENT DOCUMENTS

| | | | |
|---|---|---|---|
| 6,396,512 B1 * | 5/2002 | Nickerson ..................... | 715/751 |
| 2005/0262164 A1 * | 11/2005 | Guiheneuf et al. ........... | 707/203 |
| 2008/0141247 A1 * | 6/2008 | Saravanan ..................... | 718/100 |

* cited by examiner

*Primary Examiner* — Weilun Lo
*Assistant Examiner* — Peiyong Weng (57) ABSTRACT

A method, system, and medium are disclosed for managing calendar information associated with multiple users over a network. The calendar information may relate to scheduling, events or tasks, and is shared among users or devices. Flags may be stored in order to share and provide functionality to calendar information, such as generating calendar entries, permitting searches and coordinating calendar entries.

13 Claims, 5 Drawing Sheets

MANAGING CALENDAR INFORMATION AMONG USERS

SUMMARY

Embodiments of the invention are defined by the claims below, not this Summary. A high-level overview of various aspects of the invention are provided here for that reason, to provide an overview of the disclosure, and to introduce a selection of concepts that are further described below in the Detailed Description. This Summary is not intended to identify key features or essential features of the claimed subject matter, nor is it intended to be used as an aid in isolation to determine the scope of the claimed subject matter.

In one embodiment, a method of processing calendar information includes identifying a set of users including a first user and a second user, and receiving a first calendar entry from the first user. The first calendar entry is stored in a database accessible by the set of users. The method includes automatically associating the first calendar entry with the set of users based on a portion of the first calendar entry, and the first calendar entry is viewable by the set of users. The method includes receiving a second calendar entry from the second user, which is personal to the second user, and storing a second user's calendar information in the database. The second user's calendar information includes the first calendar entry and the second calendar entry. The method includes receiving a request for a display of at least some of the second user's calendar information over a network, and providing the display, including the first calendar entry and the second calendar entry.

In another embodiment, a method of managing calendar information includes receiving identification information from a first computing device, that indicates a first user of the first computing device is associated with a set of users including a second user, at a server. The method includes receiving a request to view first-user calendar information, which includes personal calendar information and shared calendar information, and presenting the first-user calendar information to the first computing device. A first calendar entry, including a flag, is received from the second user and associated with the set of users based on the flag. The method includes storing the first calendar entry as first-user calendar information based on the flag and automatically presenting the first calendar entry to the first computing device.

In yet another embodiment, memory is provided for storing data, including a defined set of users, including a first user and a second user, more than one time period associated with each user in the defined set of users, and a calendar entry received from the first user over a network. The calendar entry includes a flag indicating association of the calendar entry with the defined set of users. Calendar information is viewable by the defined set of users, and the calendar entry is searchable based on the flag.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Users may store information on devices, computer systems or networks for retrieval, future use or other actions. Storing information according to the present invention may involve any of the technologies discussed above or other technology capable of storing calendar information. The information may pertain to a schedule, event, or task. Users may coordinate this information with one or more other users. The methods disclosed store calendar information and provide functionality to users.

In embodiments of the present invention, multiple users, such as a group of family members, are able to receive and view their personal calendar information and some shared calendar information via computing devices. The shared calendar information may be added to users' personal calendar information automatically by other family members. In an embodiment of the present invention, a message notifies a user that calendar information has been updated or added by another family member.

The shared calendar information, in embodiments of the present invention, enables groups of users, such as a family, to store personal calendar information. Additionally, in exemplary embodiments of the present invention, when a user requests or views their own calendar information, it includes shared calendar information input by one or more other users in a group. Calendar entries from other users can be events the first user will participate in, or they can be events the first user would like to be aware of, for scheduling or coordinating activity in a family, in an exemplary embodiment. A database can store associations of multiple users, and/or multiple groups of users (including overlapping groups of users), with personal and shared calendar entries, in embodiments of the present invention.

Figure 1:
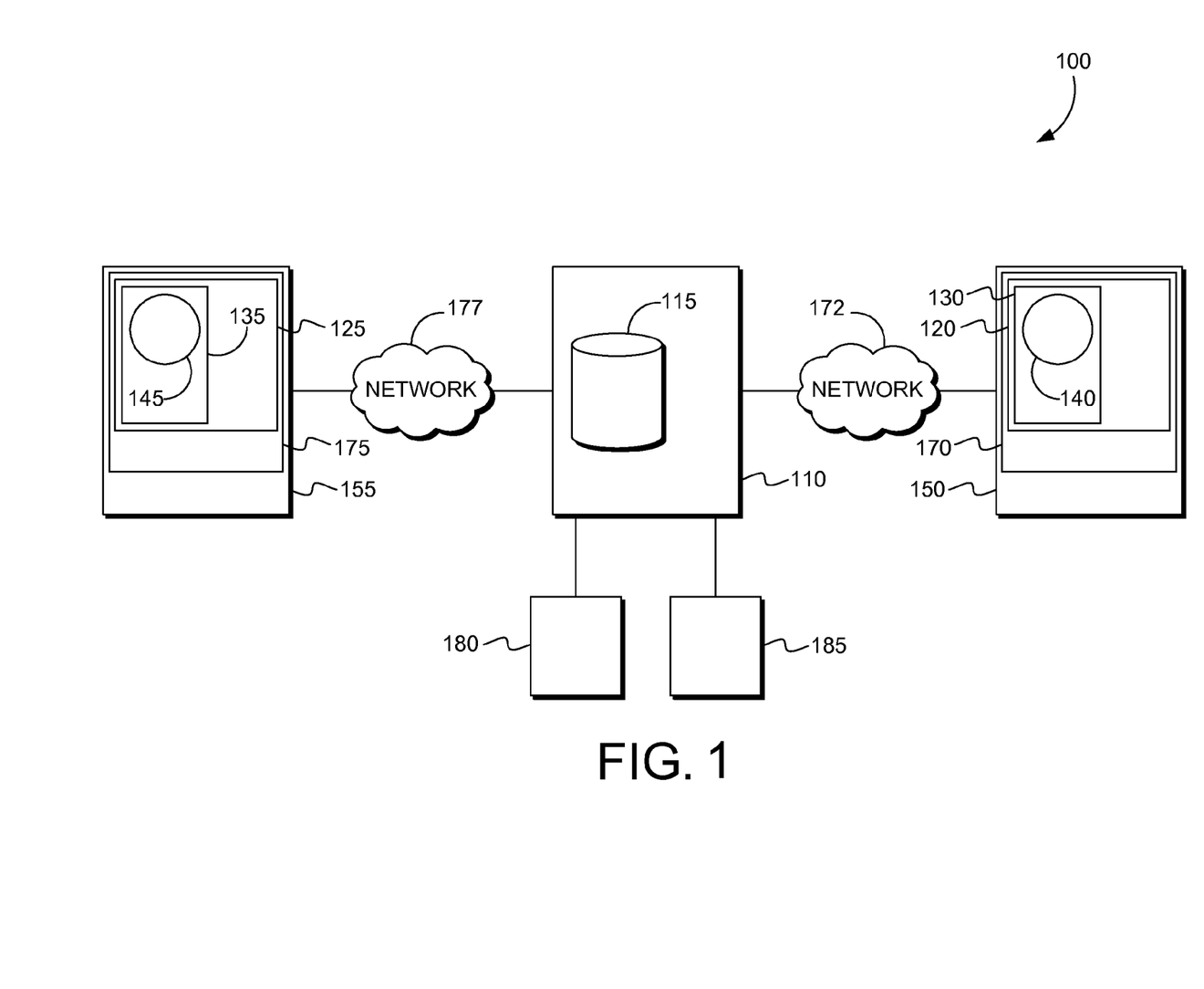
FIG. 1 is a schematic diagram depicting an exemplary network architecture for use in accordance with an embodiment of the present invention.

FIG. 1 shows a schematic diagram of an exemplary network architecture for use in accordance with an embodiment of the present invention, the network being designated generally as reference numeral 100. Users of a shared calendar access information over a network using devices. A first device 155 is shown in FIG. 1, along with a second device 150 and additional devices 180 and 185. Although devices 150, 155, 180 and 185 are uniquely numbered, these computing devices may be identical and equally capable of performing the steps disclosed herein with respect to individual devices.

As shown in FIG. 1, computing devices, such as devices 150 and 155, may be connected to a server, such as server 110, by network connections shown at 172 and 177 (respectively). In an embodiment, the server 110 is connected to a database, such as database 115, for storing personal and shared calendar information in association with users. A database, for example database 115, is remotely connected to a server in embodiments of the present invention, or the database may be included on a server, such as server 110. Embodiments of the present invention include a set of more than one user. Some users may belong to multiple sets utilizing the same database or some of the same calendar information, and there is overlap between sets of users in an embodiment. In one example, devices 155 and 150 are used by two users in a set of users.

In one embodiment of the present invention, calendar information is represented by one or more calendar entries, such as calendar entries 130, 135. Information stored or entered into a device, such as devices 150 and 155, is used as calendar information in an embodiment. An empty or available space (or the absence or deletion of entered information) is used as calendar information in an embodiment. Even information that is not intended for use as calendar information at the time of entry or storage may be used as calendar information. In an embodiment, contact information is used as calendar information when it is relevant to a calendar entry, for example, calendar entry 130. Users may directly enter calendar information, or calendar information may be obtained through a connection with a device, network, program or other source of information.

As shown in FIG. 1, the computing devices, such as devices 150 and 155, include user interfaces or display areas 170 and 175, respectively. In an embodiment, the display areas 170, 175, show results 120, 125 (respectively) of requests for calendar information. In a specific example, the results 125 shown on the device 155 represent first-user calendar information. The calendar information may reflect a time period, or other limiting criteria, discussed in more detail below. In another example, the results 120 displayed on the device 150 reflect the second user's calendar information. In embodiments of the present invention, calendar information stored in a database, such as database 115, is requested by users of the devices, such as devices 150, 155, and displayed. The user interfaces or display areas, shown at 170 and 175 in FIG. 1, may be used to input new or additional calendar information, including shared and personal calendar information, and to execute the functions discussed below, for example, selecting flags and adding new users.

Calendar information is stored or represented as one or more calendar entries 130, 135 in an exemplary embodiment of the present invention. A calendar entry could be a certain time slot or space, or an entry could be an appointment, notification, task, message, itinerary or any other piece or representation of calendar information. For example, calendar entries 130, 135 could be representations of calendar information regarding activities such as a doctor's appointment. As another example, calendar entries 130, 135 may be representations of time periods, such as 4:00-4:30 PM on a particular date. Still further, calendar information indicating the lack of an appointment during a time period may be reflected by calendar entries 130, 135.

In one embodiment of the present invention, a calendar entry, e.g., calendar entry 130, represents an increment of time. This could be any increment of time, such as an amount of minutes, hours, or other measurement, or a calendar entry may not have a certain time or duration. In some cases, a calendar entry may be a point in time, such as the start time for an event or activity. On the other hand, a calendar entry may represent a task, goal or intention of one or more users.

An event may cause the creation of a calendar entry, for example, calendar entry 130, or it may insert or update a calendar entry. The time associated with an entry depends on circumstances such as user information, changes to entries, or users logging into systems or entering criteria in embodiments of the present invention. In one embodiment, the user or software may permit the tracking of time or resources, and the time of an entry may depend on reaching a certain level. External factors may affect timing, such as the travel or health of users or the completion of preliminary steps or qualifying activities. Additionally, time zones, market conditions, accessibility or other conditions may contribute to or be used to adjust the entries 130, 135 representing calendar information. For example, a trader may use the price of an index, share price or commodity to affect or determine a calendar entry.

Calendar entries 130, 135 represent location(s), subject matter(s) or group(s) of people in embodiments of the present invention. A real or virtual place may be represented by a calendar entry 130. A topic, issue, cause or question may be indicated by calendar entries 130, 135, or individuals, group of individuals or one or more entities may be indicated. Stored entries 130, 135 are available for searching or display and may be organized or stored based on user information or requested information in exemplary embodiments of the present invention.

Some or all of the calendar information may be displayed on a device, e.g., device 150. Calendar entries, such as calendar entries 130 and 135, can be displayed graphically and/or with text through a user interface. The device 150 may display one or more calendar entries at a time, or the device 150 may display part of the information associated with an entry 130 or an icon or other symbol indicating calendar information. Any time increment or other parameter is usable or included in a display on the devices 150, 155 in one embodiment. The display may depend on the type or size of the devices 150, 155, or it may be affected by the user interface portion 170, 175 of the devices 150, 155, respectively. In some cases, the display is an audio transmission or other type of information transmission.

Devices, such as devices 150, 155, may be any device used to enter or access calendar information or access a network, such as a client device, a processor with input capabilities, a hand-held or mobile device or another part of the computer system or network. The devices 150, 155 do not necessarily need to be able to perform more than one function in embodiments of the present invention. For example, a device may allow the entry of calendar information, but not the searching or forwarding of calendar information. In another example, an employee of a company may be able to search other employees' calendar information from certain devices, such as a computer on the company's network, while other devices, such as remotely-connected or hand-held devices, may only permit searches of the employee's own calendar information. One device used to request information may not be the same device used to display information. Any and all such variations, and any combinations thereof, are contemplated to be within the scope of embodiments of the present invention.

Calendar information may be stored on the network, or by a server, such as server 110, or in a database connected to the network. In other embodiments, calendar information is stored on devices, such as devices 150 and 155, or shared between various locations. It may be stored or partly stored offline and synchronized or updated. Even if the calendar information is not stored offline, it may still be synchronized, updated or communicated over the network at time intervals, upon request, at the beginning of an application or connection, or based on the status of the calendar information.

The accessibility of the information is independent of the location of users in an embodiment. Instead, the information may made available, or temporarily or permanently stored on devices, based on users' identities, membership, or other criteria. Criteria may be determined by login information, identity checks or in accordance with other ways of verifying the status of potential users.

As more fully described below, more than one user may access, search or enter calendar information through the devices 150, 155 on a network. Embodiments of the present invention permit more than one user to access some or all of the same calendar information. Although the calendar entries 130, 135 displayed on the devices 150, 155 may vary, some or all of the underlying calendar information is shared among multiple users in an embodiment of the present invention.

This may reduce duplicative records or provide additional features, functionality or communication options. Software products may automatically perform functions or permit the functions to occur in the system. Some steps may be caused by the software product and/or implemented, in whole or in part, by additional software on the network or the devices 150, 155.

As shown in the exemplary embodiment in FIG. 1, the calendar entries 130, 135 are associated with flags 140, 145, respectively. Characteristics or flags provide or store additional information or functionality at the time of entry or in the future. The association of flags 140, 145 with calendar entries 130, 135 (respectively) may be at the direction of the user or based on computer-readable instructions. Associations made after the time of entry may be caused by new information available through the network, such as user, group or event information. Association with an entry, e.g., calendar entry 130, may be storage proximate to the entry, or relating a flag 140 to the calendar entry, such as spatially or conceptually.

One characteristic associated with a calendar entry may be participation or membership in a group of users or devices. Participation in a group may be defined, by way of example only, as being identified as a family member, an immediate family member, or a member of a household. In other embodiments, users may be considered members of a group based on, for example, considering or accepting employment, purchasing a product, visiting or joining an online entity, accepting terms, registering, donating, logging into a network or using certain hardware, software or computing features. In other embodiments, a group may be a list of invitees, accepted invitees, winners, qualifiers, alumni, customers, philanthropists or any other group of users.

A user may be determined based on identification information, for example, a user name, password, access to a network or account, or use of an authenticated or recognized device.

Users, or groups of users, are recognized automatically in embodiments of the present invention. In a specific embodiment, users are added to a group automatically, thereby receiving access to shared calendar entries associated with that group, based on information, such as electronic lists, authentication requirements, domain names (for example, email addresses ending in "@companyABC.com"), certain device characteristics, or lists from other software, programs or databases. This information could be available at a server, such as server 110, a database, such as database 115, or over a network connection.

Calendar entries 130, 135 are associated with flags 140, 145 (respectively) regarding location or time in one embodiment. For example, a particular location may be a flag 140 associated with a calendar entry. This may permit users to store, organize, search or display calendar entries based on the location. An example of a flag 140 that may be associated with an entry 130 is a topic, subject or other indication of relevance. Keywords included in an entry 130 may act as a flag 140 or be used to determine or locate characteristics or flags.

In an embodiment, a user lives in a home where an event indicated by an entry will take place. This user may set his preferences to notify him of entries associated with this flag (the home). Notification is by a message, such as an electronic, instant or Short Message Service ("SMS") message, or a display upon access or log-in by a user, in embodiments of the present invention. Alternatively, a user may be notified of new or updated calendar information upon accessing calendar information from a device, such as device 150. In some cases, a user selects an option, such as a flag or setting within a group, indicating the user desires notification of specific calendar entries. In an exemplary embodiment, new or updated entries are highlighted or otherwise differentiated from other calendar entries. This may enable users to identify or be aware of shared calendar entries received from other users.

As a specific example, a teenager lives in a home with other family members. The teenage user chooses to receive notification of calendar entries from other users that take place in the home. In other words, the teenager, whether or not he will attend the activities represented by the calendar entries in the home, would like this calendar information shared with him. In an exemplary embodiment, when other family members enter calendar information indicating an entry taking place in the home, they may select an option indicating such, thereby providing this information for access by the teenager.

In another embodiment, it is automatically determined, based on the calendar entry by a family member, that the entry involves the home. The teenager may be notified of the entry, or he may be able to search and/or view the entry. In other cases, the teenager may be able to view limited information about the entry. For example, a parent may add a calendar entry and provide the teenager with access to a limited amount of information about the entry, such as the starting time, duration or type of entry (e.g., a business meeting or a meal).

In an exemplary embodiment, calendar information is requested over a network and the response to a request may be based on flags associated with specific entries. Alternatively, a request may search flags associated with calendar entries. In another embodiment, a characteristic associated with an entry may generate an additional entry for another user. As shown in FIG. 1, in an embodiment, an entry 130 is displayed on the second device 150. The display of the calendar entry 130 may or may not include display of the flag 140 as well. In an exemplary embodiment, calendar entry 135 is displayed on device 155.

Figure 2:
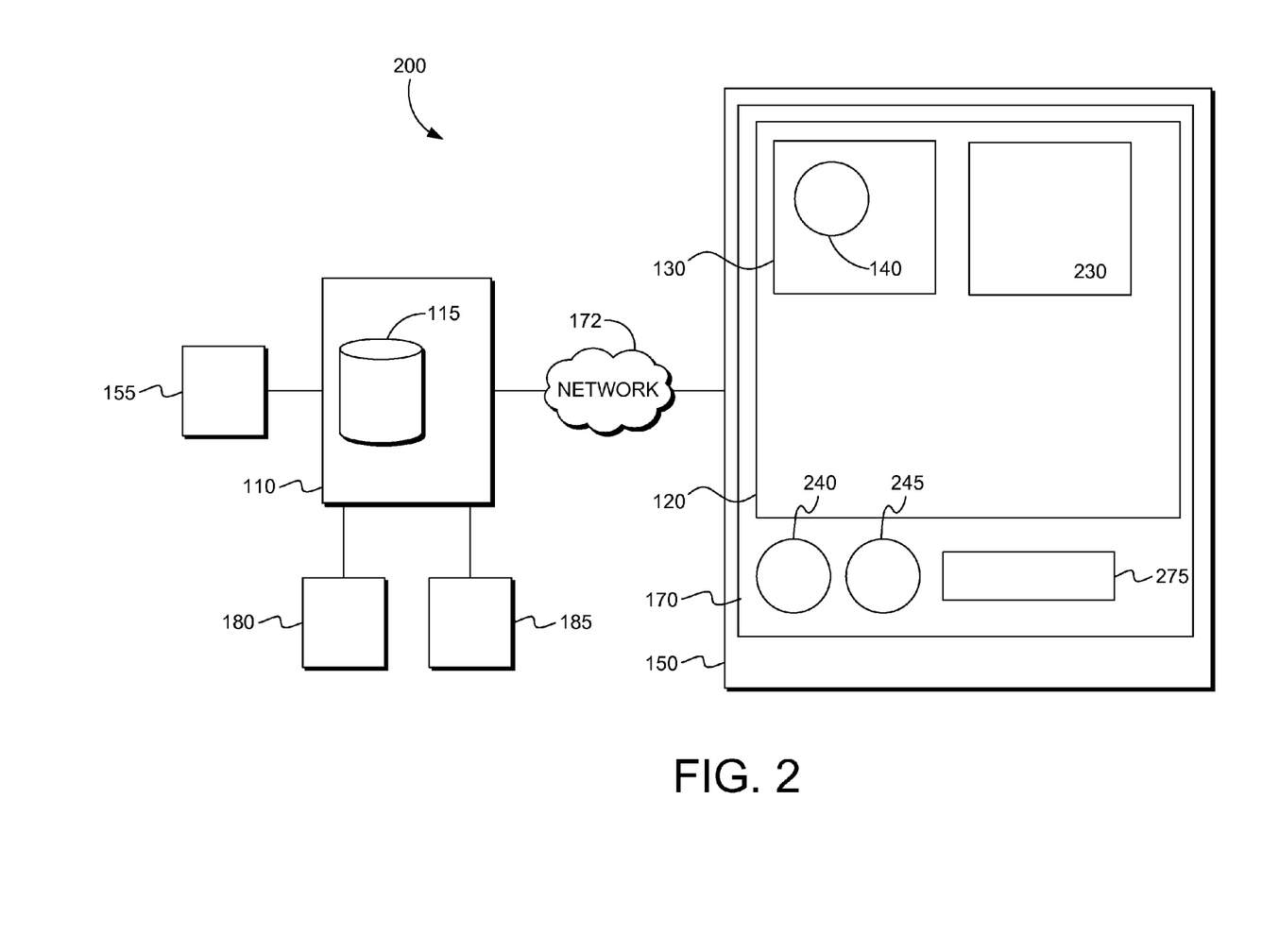
FIG. 2 is a schematic diagram depicting an exemplary network architecture for use in accordance with an embodiment of the present invention.

FIG. 2 is a schematic diagram illustrating an exemplary network architecture in accordance with an embodiment of the present invention, the network architecture being designated generally as reference numeral 200. As shown in one embodiment in FIG. 2, a device 150 includes a display area or user interface at 170, including a portion of calendar information at 120. The device 150 communicates with a server, such as server 110, over a network connection 172. This enables a user of the device 150 to request calendar information stored in a database, for example, database 115, in an embodiment. Users of the devices, such as device 150, may add, update or otherwise manipulate personal and shared calendar information in a database, such as database 115. In some embodiments, calendar information is stored in more than one database accessible over one or more network connections.

Device 150 in FIG. 2, with display or user interface area 170, includes search input area 275. In an embodiment, a user directs a search of personal or shared calendar information through input area 275. Search results are based on flags in an embodiment of the present invention, or search results may be based on keywords or users. The status of calendar entries as search results may be used as a flag 140, either automatically, or based on approval, review or selection by the user.

Calendar entries, such as calendar entry 130, may be searched for entire flags or for information within a flag, such as flag 140. The keyword search discussed above is one specific form of a request for calendar information. Various requests for calendar information over a network or utilizing various devices, such as devices 150 and 155, are possible, through the search input area 275 or another area. Users may enter or request information by entering keystrokes, touch, gestures, voice commands or other input capable of detection. Requests may target calendar entries, users, time periods or other criteria, and flags and may be used to activate searches.

In the exemplary embodiment illustrated in FIG. 2, potential flags 240, 245 are displayed. Potential flags 240, 245 are selectable for inclusion with new or existing entries, such as entry 130, in an embodiment of the present invention. As a specific example, a user may be a member of a group of family members, and the user may be a member of a group of certain family members attending a family vacation. In this example, potential flag 240 indicates the group of family members, and potential flag 245 indicates the group attending the family vacation. The user may select flag 240 for calendar entries intended for the entire group of family members. In other cases, when a calendar entry is relevant to the family vacation, the user may select flag 245.

Any number of potential flags, such as potential flags 240 and 245, may be displayed for selection by users. The potential flags may represent current groups a user is associated with, or they may include groups the user has not joined yet. In an embodiment, a user may request to join a group through potential flags. Users are able to add flags, through potential flags or other methods discussed herein, to new or existing calendar entries, created by any user, in embodiments of the present invention.

In other embodiments, users may select an option or link to request information. Another user or the system, network or devices 150, 155, 180, 185 may prompt a user to request certain information. A request for calendar information by one user may be a request to determine the availability, interest or capability of other users. Characteristic or flag 140 is associated with calendar entry 130 and may coordinate entry 130 with other entries or multiple users. In other embodiments, the flag 140 may be used to provide functionality or additional information to users, or the flag 140 may be targeted during searches. Functions based on flags or selected calendar information may be used to update, supplement, forward or process information or calendar entry 130. The characteristic or flag 140 may be interactive or dynamic.

As a specific example, the use of a flag indicates a calendar entry should be forwarded to any users that join a group, which may be subject to an expiration date or other limitation. Alternatively, the flag indicates the calendar entry should be forwarded based on updates to the calendar entry by users. Embodiments may included forwarding calendar entries based on updates by certain users (the creating user, parents in a family, etc.) or updates to certain aspects of the calendar entry (the time, place, etc.). Flags, such as flag 140, may be used to supplement calendar entries. For example, a flag may link to or include contact information for users or entities associated with a group of users (e.g., the website of club), assistance or details regarding locations, such as maps, access to time zone differentials, or other dynamic information relevant to calendar entries or groups of users.

Calendar entries, in accordance with embodiments of the present invention, are updated based on flags. As a specific example, a calendar entry represents a charity event. A flag associated with the calendar entry may update the display of calendar information based on the amount of money raised for the charity event. In another example, flags indicate calendar entries should be processed or used. Specifically, a user may associate flags with calendar entries representing a particular project, such as designing a building or attending speech therapy. Therefore, when a user would like to know the total time spent designing a building or attending therapy, during a certain time period or overall, a request based on the flags would display this information.

Because the tracked information may be shared calendar information, as well, it is possible for one user to track the amount of time other users spend on particular activities, tasks or meetings, in embodiments of the present invention. In other words, in an exemplary embodiment of the present invention, a parent may receive information regarding calendar entries associated with teenagers in the family, to stay informed, attend activities, and monitor the amount of time a teenager spends at various activities.

In an embodiment, a flag 140 or calendar entry 130 indicates information will be input or modified in the future, or will be updated regularly, and may include a reminder function. In an example, a flag 140 monitors activity and/or expenses. Flags, such as flag 140, may be data or metadata indicating characteristic(s) of calendar entries. They may be represented as icons, colors, placement, location, format, style or other indicators. In other instances, a flag may be present or functional, but not apparent to a user. Multiple flags may be associated with one entry.

A flag, for example, flag 140, relates to scheduling or conflict information, in one embodiment of the present invention. In other embodiments, flags may indicate a reminder or reminder request. It is not practical to list all possible flags here, but other examples of flags include status, location, agenda, billing, invoice, travel, mileage, overtime, time zone or time change information. In one specific example, a calendar entry 130 is a daily, weekly, annual or other type of recurring event, and flag 140 is associated with calendar entry 130. In this example, flag 140 indicates the calendar entry 130 is associated with other calendar entries, or flag 140 may generate additional calendar entries. In this illustrative embodiment, a flag 140 indicating a weekly event may be added to a calendar entry 130, which causes weekly calendar entries to be created for one or more users.

Information for future use or retrieval is stored in flags, such as flag 140, in an embodiment of the present invention. Such information may include responses to requests, attendees, minutes, contact information, or the time of creation. Flags, e.g., flag 140, may allow interaction, such as responses, and flags may contain shared or posted information, allow comments, searches, expiration, updates, or the addition of new information (such as adding or requesting to add users, groups, or other appointments). Notifications generated for users based on flags may include any of the information available for the flags.

The network or other components of the system may pull calendar information from any calendar or scheduling system for initialization, comparison or synchronization purposes. Shared calendar entries may not be identical for different users or displays. For example, the duration or location associated with a calendar entry may vary. Additionally, the display on different devices or for different users may vary. These variations may be determined automatically or set by one or more users. Users may format or customize the calendar system or calendar entries, e.g., calendar entry 130. The devices used, such as a hand-held computing devices, may affect the format or characteristics of the calendar entries. Shared calendar entries may appear identical or different based on preferences, status (of the calendar entry or the user), confidentiality, or customization. Displays may vary among users, devices, connections or time periods (such as before and after the expiration of information).

Each user may view a unique representation of a shared calendar based on the calendar information. In one exemplary embodiment, a representation of calendar information on a device 150 includes calendar entries 130 and 230. As an example, one entry 130 represents shared calendar information, while another entry 230 represents personal calendar information. Personal calendar information may be any calendar information that is not shared calendar information. For example, appointments, meetings or any other events involving only one user from a group of users is considered personal calendar information in an embodiment. In an embodiment, personal calendar information for a user includes calendar entries input by that user, while shared calendar information may include calendar entries input by other users.

Users are able to change the status of calendar information from personal calendar information to shared calendar information in an exemplary embodiment of the present invention. As a specific example, a user of a device 150 views a personal calendar entry 230. In this example, the user may input information or select an option, such as a flag, including a potential flag, in order to share the calendar entry 230 with one or more other users. A message, for example an SMS message, may be sent to other devices, e.g., 155, 180 and 185, indicating shared calendar information has been added. Alternatively, the user of the device 155 may be in a group with the user of device 150, while the users of devices 180 and 185 are not in the group. Embodiments of the present invention update or add shared calendar information only for the user of the device 155 that is a member of the group associated with the entry 230.

In some embodiments, a user in a group may forward a calendar entry or other invitation to a second user. The second user may or may not be a member of the group. In some cases, the original creator or user associated with a calendar entry may limit this ability, by, for example, restricting the forwarding to members of a group or approved users. In one example, when a user forwards a calendar entry to a new user, the original creator of the calendar entry must provide approval before the new user receives the entry or the ability to view the entry or join the group.

Figure 3:
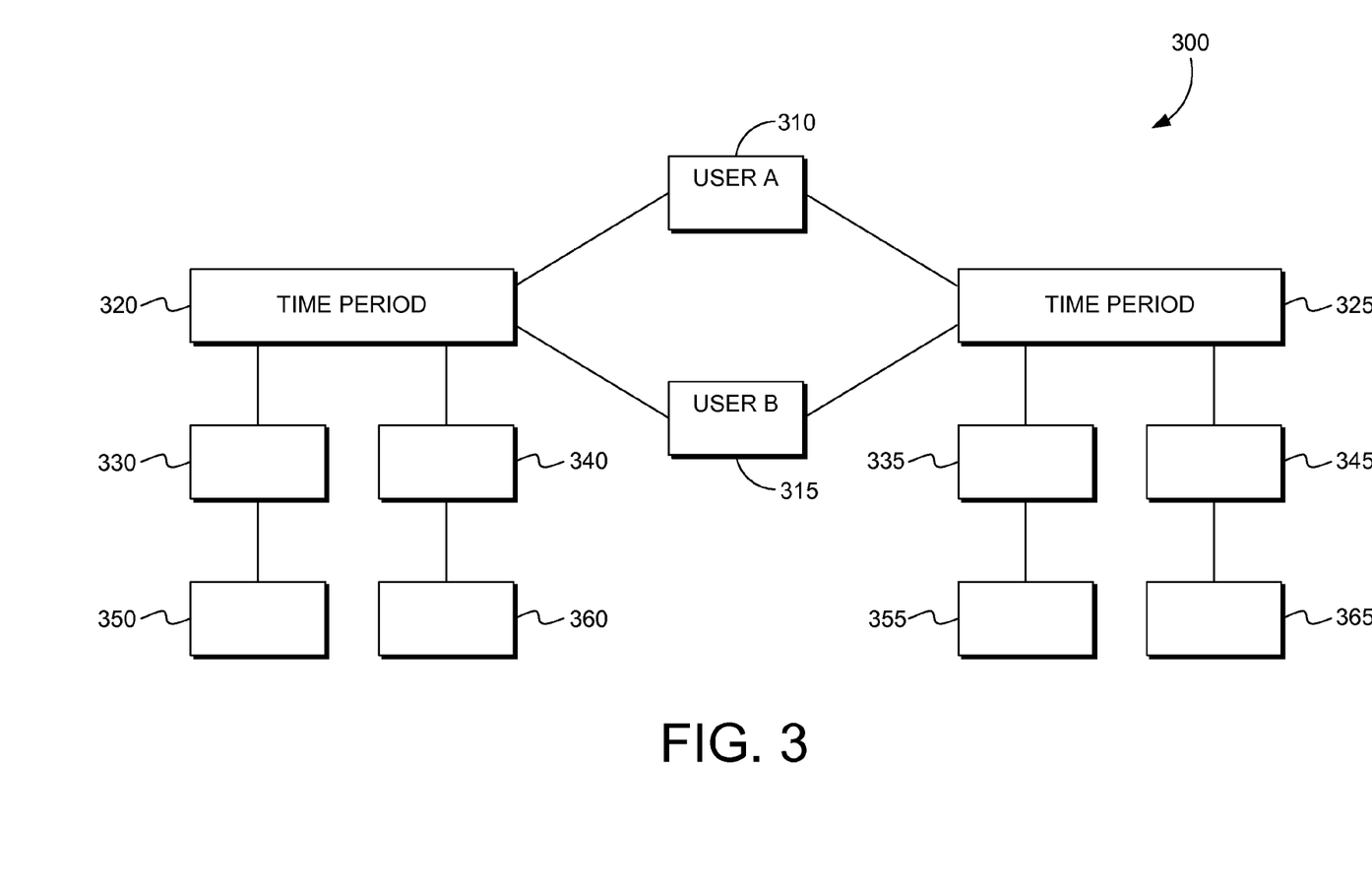
FIG. 3 depicts an illustrative data structure in accordance with an embodiment of the present invention.

FIG. 3 depicts an exemplary data structure in accordance with an embodiment of the present invention, the data structure being designated generally as 300. User A is shown at 310 and is associated with time periods 320, 325. Likewise, User B at 315 in the embodiment shown in FIG. 3 is associated with time periods 320, 325. One time period 320 is shown with calendar entries 330, 340 and flags 350, 360. Another time period 325 is shown with calendar entries 335, 345 and flags 355, 365. In the exemplary data structure in FIG. 3, User A 310 and User B 315 may each be associated with any of the entries 330, 340, 335, 345. Users, time periods, entries and flags may be stored in a hierarchal arrangement, or these elements may be presented or searched according to some or all of the levels or relationships of stored calendar information.

In an exemplary embodiment, User A 310 and User B 315 are part of a defined set of users. As discussed above, a set of users may be defined by users, based on approval, or based on other ways of recognizing or accepting users as part of a group of users. In some cases, a set of users may be defined automatically based on other criteria, such as electronic mail addresses or membership. In an embodiment, calendar entries associated with a set of users, including User A 310 and User B 315, are stored for access by an application that is executed on a data processing system. Calendar information stored in a database, such as database 115 in FIG. 1, is viewable by the set of users. As shown in the exemplary embodiment in FIG. 3, each user is associated with more than one time period 320, 325. In a specific example, the time period 320 represents one month and the time period 325 represents a different month. As discussed above, embodiments of the present invention are capable of using any time period for storing, presenting, displaying or searching calendar information.

In an embodiment, a calendar entry is received from a first user, such as User A 310, including a flag (e.g., flag 140 in FIG. 1) indicating association of the calendar entry with the set of users. In an embodiment, the calendar entry is searchable based on the flag. In embodiments of the present invention, calendar entries being searchable indicates that, when a user requests certain calendar information, calendar entries with certain flags may be returned or displayed to, or selectable by, a user based on the flag.

As discussed above, various search criteria may limit requests for calendar information, such as dates, locations, participants, status (such as, by example only, past-due, upcoming, conflicting, updated, personal or shared calendar information). Embodiments include calendar entries searchable through a search input area, such as search input area 275 shown in FIG. 2, by, for example, keyword, user name or location. It is not practical to list all potential search criteria possible with embodiments of the present invention, but the examples given herein indicate users may request particular calendar information directly or automatically. An automatic search may limit calendar information based on restrictions on devices or users, such as requesting particular calendar information for children in a family.

Figure 4:
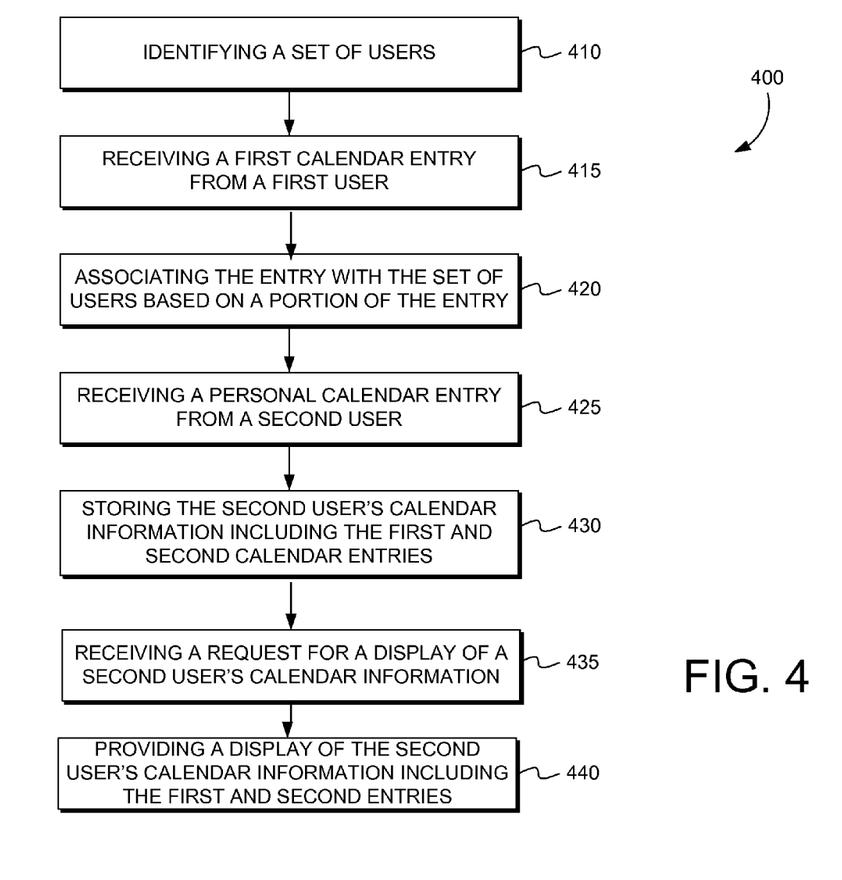
FIG. 4 is a flow diagram illustrating a method of processing calendar information in accordance with an embodiment of the present invention.

FIG. 4 is a flow diagram illustrating a method 400 of processing calendar information in accordance with an embodiment of the present invention. In the embodiment shown in FIG. 4, a set of users is identified, including a first and second user, at 410. At 415, a first calendar entry (for instance, calendar entry 135 of FIG. 1) is received from the first user and stored in a database, for instance, database 115 of FIG. 1. The calendar entry is associated with the set of users at 420, based on a portion of the first calendar entry (e.g., flag 140 of calendar entry 130 of FIG. 1). At 425, a second, personal calendar entry is received from the second user, and at 430, the second user's calendar information is stored in the database, including the first and second calendar entries. At step 435, a request is received from the second user for a display of calendar information. The association may be triggered by the request. At 440, a display of the second user's calendar information is provided to the second user, including the first and second calendar entries.

Figure 5:
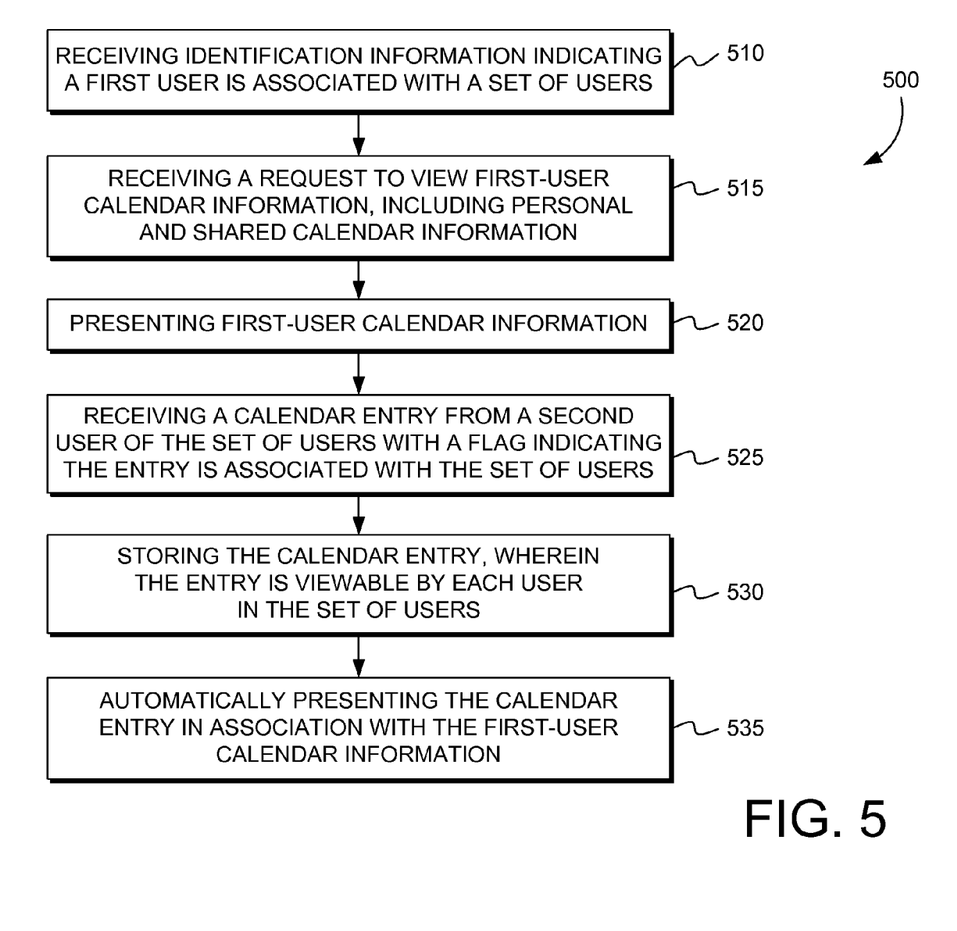
FIG. 5 is a flow diagram illustrating a method of managing calendar information in accordance with an embodiment of the present invention.

FIG. 5 is a flow diagram illustrating a method 500 of managing calendar information, in accordance with an embodiment of the present invention. At 510, a server receives identification information (e.g., from first computing device 155 of FIG. 1 over a network connection 177) that indicates the user is associated with a set of users, including a second user. A request is received to view first-user calendar information, including personal and shared calendar information, at 515, and presented at 520. A calendar entry, including a flag, is received from a second user via a second device (e.g., second computing device 150 of FIG. 1 over a network connection 172), and the entry becomes associated with the set of users based on the flag as indicated at 525. The calendar entry is stored as first-user calendar information, as indicated at 530, and is viewable by each user in the set of users. The entry 130 is automatically presented to the first user at the device, as indicated at 535.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-useable instructions embodied thereon for performing a method of processing calendar information, the method comprising:
 identifying a set of users including a first user and a second user;
 receiving, at a first computing device, a first calendar entry from the first user, wherein the first calendar entry represents an event, wherein a portion of the first calendar entry indicates that the first calendar entry is associated with the set of users, wherein the portion is automatically added to the first calendar entry based on subject matter of the first calendar entry, and wherein the first calendar entry is stored in a database accessible by the set of users;
 automatically associating the first calendar entry with the set of users based on the portion of the first calendar entry, wherein the first calendar entry is viewable by the set of users based on the portion of the first calendar entry that indicates that the first calendar entry is associated with the set of users;
 receiving a second calendar entry from the second user via a second computing device, wherein the second calendar entry is personal to the second user such that the second calendar entry does not include the portion indicating that the second calendar entry is associated with the set of users;
 storing the second user's calendar information in the database, wherein the second user's calendar information includes the first calendar entry and the second calendar entry;
 receiving a request from the second user for a display of at least some of the second user's calendar information over a network;
 providing the display of the at least some of the second user's calendar information to the second user, wherein the display includes the first calendar entry and the second calendar entry, wherein at least one potential flag is presented via a user interface on the second computing device, and wherein the potential flag indicates a group with which the second user is not currently associated;
 receiving a request from the first user for a display of part of the second user's calendar information over the network; and
 providing the display of part of the second user's calendar information to the first user, wherein
  A) the first calendar entry is provided to the first user because the first calendar entry includes the portion that indicates an association with the set of users,
  B) and the second calendar entry is not provided to the first user because the second calendar entry does not include the portion that indicates an association with the set of users.

2. The one or more nontransitory computer-readable media of claim 1, wherein the set of users includes members of a household or family.

3. The one or more nontransitory computer-readable media of claim 1, wherein the set of users includes members of a defined group.

4. The one or more nontransitory computer-readable media of claim 1, wherein the portion of the first calendar entry is searchable.

5. The one or more nontransitory computer-readable media of claim 1, wherein the method further comprises determining the set of users based at least in part on approval by the first user.

6. The one or more nontransitory computer-readable media of claim 1, wherein the method further comprises adding an additional user to the set of users based at least in part on an invitation from the first user.

7. The one or more nontransitory computer-readable media of claim 3, wherein the method further comprises adding an additional user to the set of users based at least in part on the additional user obtaining membership status in the defined group.

8. The one or more nontransitory computer-readable media of claim 1, wherein the method further comprises:
 receiving a change to the first calendar entry from the second user; and
 storing the change to first calendar entry.

9. The one or more nontransitory computer-readable media of claim 8, wherein the method further comprises:
 receiving a request for a display of at least some of the first user's calendar information from the first user, wherein the first user's calendar information includes the first calendar entry; and
 providing the display of the first calendar entry to the first user, wherein the display reflects the change to the first calendar entry received from the second user.

10. One or more nontransitory computer-readable media having computer-useable instructions embodied thereon for performing a method of managing calendar information, the method comprising:

at a server, receiving identification information from a first computing device over a network that indicates a first user of the first computing device is associated with a set of users including a second user;

receiving a request from the first user to view the first user's calendar information, wherein the first user's calendar information includes the first user's personal calendar information and shared calendar information;

presenting the first user's calendar information to the first computing device by way of the network;

receiving a first calendar entry including a flag from the second user via a second computing device, wherein the flag included in the first calendar entry indicates that the first calendar entry is associated with the set of users, wherein the flag is automatically indicated in the first calendar entry based on a keyword in the first calendar entry, wherein at least one potential flag is presented via a user interface on the second computing device, and wherein the potential flag indicates a group with which the second user is not currently associated;

storing the first calendar entry, which was received from the second user, as the first user's calendar information based on the flag indicating that the first calendar entry is associated with the set of users; and automatically presenting the first calendar entry to the first computing device by way of a Short Message Service ("SMS") message.

11. The one or more nontransitory computer-readable media of claim 10, wherein the flag is added to the first calendar entry by the second user.

12. The one or more nontransitory computer-readable media of claim 10, wherein the flag comprises the keyword.

13. The one or more nontransitory computer-readable media of claim 7, further comprising:

adding a third user to the set of users;

storing the first calendar entry as third-user calendar information based on the addition of the third user to the set of users;

receiving a request to view the third-user calendar information from the third user; and presenting the third-user calendar information, including the first calendar entry.

\* \* \* \* \*